July 21, 1931. J. LONG 1,815,517
MEANS AND METHOD FOR INTERLOCKING BOLTS AND NUTS
Filed Feb. 3, 1930
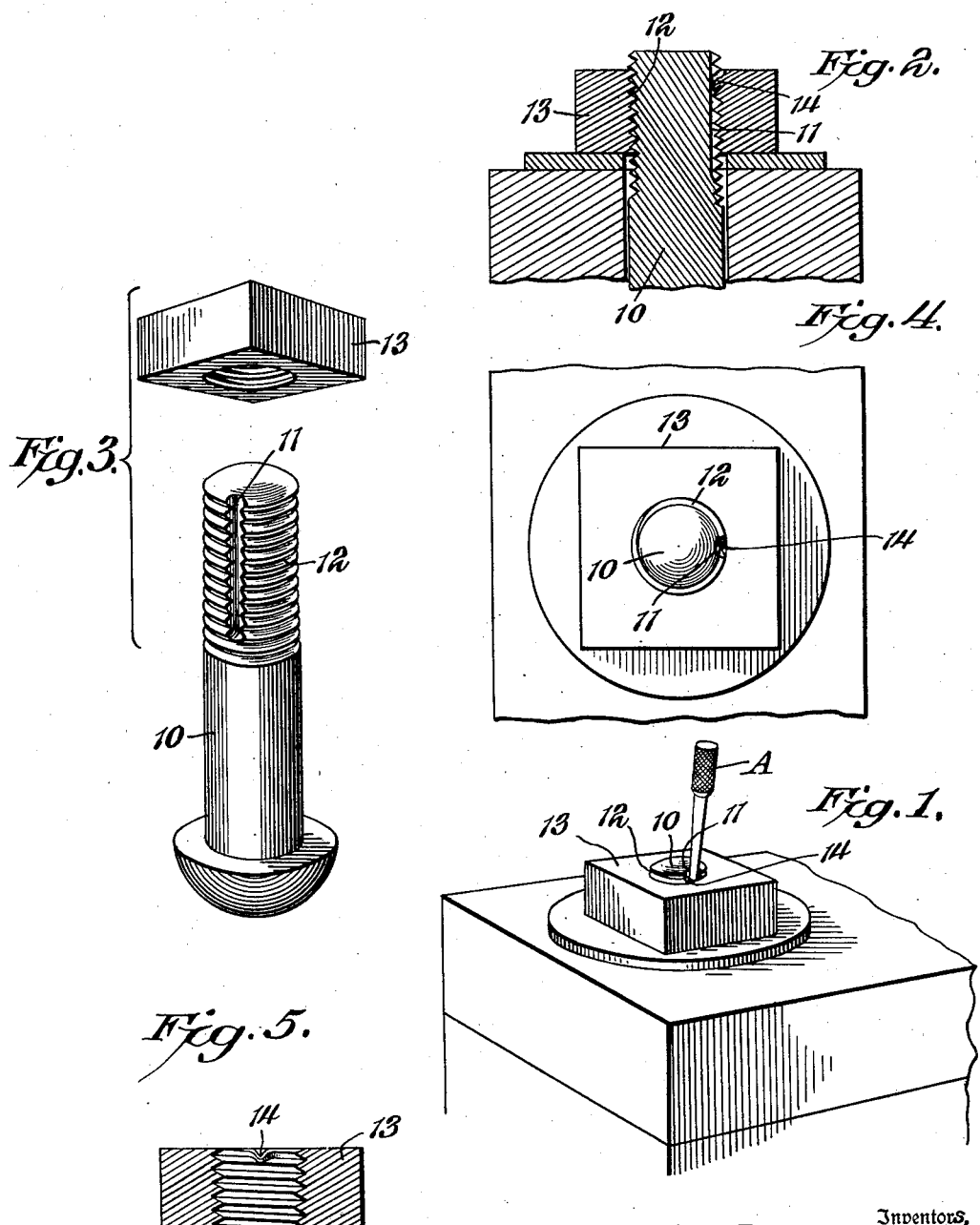

Patented July 21, 1931

1,815,517

UNITED STATES PATENT OFFICE

JOHN LONG, OF TIPTON, IOWA

MEANS AND METHOD FOR INTERLOCKING BOLTS AND NUTS

Application filed February 3, 1930. Serial No. 425,647.

My invention relates to means and method for interlocking bolts and nuts. It has for its objects to provide for interlocking a bolt and its nut so that while the bolt and nut will be prevented from becoming accidentally unlocked the unlocking may be effected by relative rotation of the bolt and nut by applying a wrench or other means for rotation of one of the elements and thus make it possible to entirely remove the nut, or permit it to be tightened and to again interlock the two elements—the bolt and nut. Heretofore, bolts and nuts have been interlocked one with the other by forming both elements with registering axially extending recesses and providing a key fitting in the registering recesses so as to prevent one element rotating relatively to the other; also to form a depression in one element, say the bolt, and by means of a punch drive a portion of the other element into said depression so as to prevent the bolt and nut from rotating relatively one to the other but such means effected such a permanent interlocking of the bolt and nut together that the unlocking could not be effected except with difficulty and practically destroying the efficiency of the bolt or nut for further use, and also preventing further tightening or threaded adjustment of the bolt or nut subsequent to the initial adjustment and locking of the elements together as frequently as necessary, especially in connection with rails and other railroad constructions. Said previously practiced methods and means also involved time and expense which rendered the same impracticable or undesirable from commercial view points. The present invention has for its objects to overcome the objections heretofore existing in means and methods practiced for effecting an interlocking of bolts and nuts, and to provide for simplicity in efficiently interlocking bolts and nuts, and make is possible to release the interlocking of the two elements and effect repeated interlocking of the two elements after further threaded adjustments of one element relatively to the other, without discarding either element and with economy of time and expense. To the accomplishment of the foregoing objects and such others as may hereinafter appear the invention consists in the method and means hereinafter described and then sought to be clearly defined by the claims, reference being had to the accompanying drawings forming a part hereof and in which, Figure 1 is fragmentary, perspective view, illustrating how a bolt and nut may be interlocked one with the other;

Figure 2, a vertical sectional view of the bolt and nut and indicating how the thread of one element, say the nut, is deformed to form a teat to effect the interlocking of the bolt and nut;

Figure 3 is a perspective showing the bolt and nut separated;

Figure 4 is an end view showing a nut applied and locked to a bolt according to the present invention;

Figure 5 is a vertical section through a nut showing the locking teat made under the method of the invention.

In the drawings the bolt 10 is shown as formed with a groove 11 extending in the direction of the longitudinal axis of the bolt and bisecting the screw threads 12 of the bolt for a greater or less portion of the threaded part of the bolt. This groove, as illustrated, has a depth approximately or substantially equal to the depth of the threads of the bolt so as to preserve practically the normal strength of the bolt, and the groove is illustrated as having a semi-circular, transversely curved bottom, which is the preferred construction as it contributes to some extent or degree in facilitating the unthreading of the nut when a wrench or other suitable tool is employed for unlocking the nut preparatory to its further adjustment on the threaded portion of the bolt for tightening the nut in taking up wear on the parts, or for unthreading the nut entirely from the bolt when desired to completely remove the nut for any purpose whatsoever.

The nut of the bolt is designated by the numeral 13. It may be of any approved type and as illustrated is a four sided nut but may be hexagonal or any other selected polygonal sided nut. The bolt and nut may each be of any standard form, provided the bolt is formed with a longitudinal groove 11 such as before mentioned. The method of interlocking the two elements, that is, the bolt and nut, involves the following steps. After the nut is applied to the bolt a suitable tool, for instance a punch A is introduced into the groove 11 of the bolt as illustrated in Fig. 1 of the drawings so that the inner end of the punch will contact with the portion of say the first or outermost thread of the nut which spans or crosses the groove of the bolt which fits within the nut; then by a hammer or other suitable tool, the punch is driven axially of the bolt so as to distort or deform the thread of the nut against which the end of the punch bears to form a projection or teat 14 which will lie within the groove 11, as shown in Figs. 2 and 5 of the drawings, and bear against a side wall of groove 11 or the end of a thread of the bolt next to the groove, and form a lock or stop that will prevent accidental release or unlocking of the nut and bolt, and after the teat or projection has been formed the tool or punch is withdrawn from the bolt groove for further use when desired. The teat or projection is of such character as to interlock the bolt and nut against accidental loosening of the nut and yet permit the nut to be rotated by use of a wrench so as to press or force the teat towards its former or normal position sufficiently to allow the nut to be rotated, without destroying the threads of the bolt, and allow the nut to be screwed up to take up any looseness arising in use of the bolt and nut, or allow the nut to be entirely removed from the bolt and used again on the same bolt, or on another bolt. When the nut has been screwed up to take up slack or looseness in the parts the punch is again fitted in the groove of the bolt and driven so as to deform another portion of the same thread, or another thread of the nut, to effect another interlocking of the bolt and nut by another teat formed by the same method; and the foregoing is repeated as often as desired or necessary. It will appear from the foregoing that very simple and efficient method and means are provided for interlocking a bolt and nut, and which permits use of the same bolt and nut in repeated interlocking positions, and also release of the interlock, between the two elements. These are important considerations and results, in various arts and places where it is necessary to interlock bolts and nuts, and is especially of value in connection with railroads where it is desirable and at times very necessary at intervals to release a lock between a bolt and nut to permit a further adjustment of parts to compensate for wear and tear. Another advantage resulting from the formation of a longitudinal groove in the threaded portion of a bolt which receives a nut is that the groove serves as a guide for placing and directing the punch in proper position for effecting a deformation of a thread of the nut to form a lock between the bolt and nut. Especially is this so as at times the bolt and nut may be in a place where it is difficult for the workman to see the parts clearly enough for properly positioning the punch to deform the thread of the nut to effect the interlocking of the bolt and nut. The longitudinal groove in the bolt is of a depth sufficient to serve the purposes mentioned yet without detrimentally weakening or detracting from the inherent strength of the bolt.

The method also makes it possible to locate the locking teat within the threaded bore of the nut adjacent to the threads of the bolt where it is confined or housed within the bore or interior of the nut. It also avoids the necessity of making a specially formed nut and enables a standard type of nut to be used. As before stated it also makes possible to effect repeated interlocking of the bolt and nut at various points throughout the area of the threads of the nut and of the bolt in the direction of the longitudinal axis of both at such points to which the end of the punch may reach while also permitting threaded adjustment of one element relatively to the other without stripping or otherwise damaging or impairing the efficient functioning of the threads of either element.

The preferred details of the features of both elements and the successive steps of the method have been illustrated and described but changes embodying the essentials disclosed and sought to be defined by the appended claims are included within the scope of the invention.

Having described the invention and set forth its merits what I claim is:—

1. A method of interlocking an interiorly screw-threaded element and a exteriorly screw-threaded elment consisting in longitudinally grooving one of said elements, connecting one element to the other element by the screw threads of both elements, then deforming a thread of one element to form a teat for engagement with a thread of the other element adjacent to the longitudinal groove in said element for interlocking the two elements against accidental displacement of one element relatively to the other.

2. A method of interlocking bolts and nuts consisting of forming a longitudinal groove in the threaded bolt, placing a nut upon the bolt, then placing a tool in the groove, and then distorting the top portion of at least one of the nut threads contiguous to the longitudinal groove of the bolt by an axial movement of the tool to form a teat for engagement with a part of the other element adjacent to the longitudinal groove in said element for interlocking the two elements against accidental displacement of one element relatively to the other.

3. A method of interlocking bolts and nuts consisting of forming a longitudinal groove in the threaded bolt, the depth of said groove being substantially the depth of the bolt threads, placing a nut upon the bolt, then placing a tool in the groove, and then distorting the top portion of at least one of the nut threads which extends across the groove of the bolt by an axial movement of the tool.

4. An externally screw-threaded element formed with a longitudinally disposed groove extending transversely to the threads of the element, and an internally threaded element in threaded engagement with the externally threaded element, one of the threads of the internally threaded element being deformed to form a teat for engagement with a part of the externally threaded element adjacent to the longitudinal groove of the externally threaded element for interlocking the two elements, said teat being adapted to be moved out of interlocking engagement with the externally threaded element to permit one element to be adjusted relatively to the other element.

5. A method of interlocking bolts and nuts consisting of forming a longitudinal groove of substantially uniform depth in the threaded bolt, the bottom of the groove extending below the bottom of the bolt threads, placing a nut upon the bolt, then placing a tool in the groove, and then distorting only the top portion of at least one of the nut threads which lies in the groove by an axial movement of the tool.

In testimony whereof I affix my signature.

JOHN LONG.